Aug. 22, 1967 YOSHIRO NAKAMATSU 3,337,694

APPARATUS FOR SIGNAL TRANSDUCING ALONG A CURVED OVERLAPPING TRACK

Original Filed March 31, 1959

2 Sheets-Sheet 1

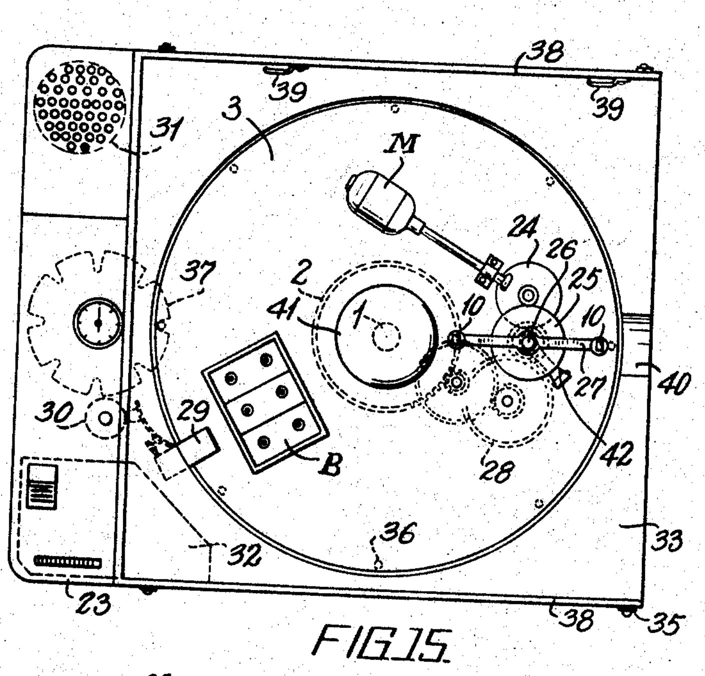
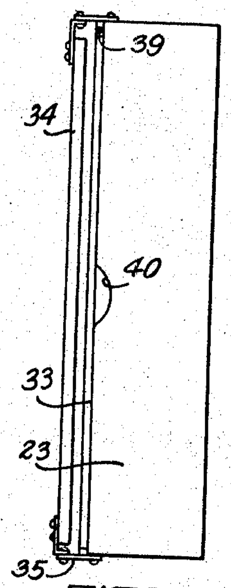
FIG. 16.
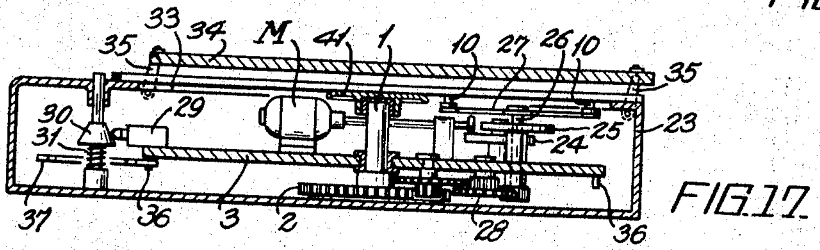
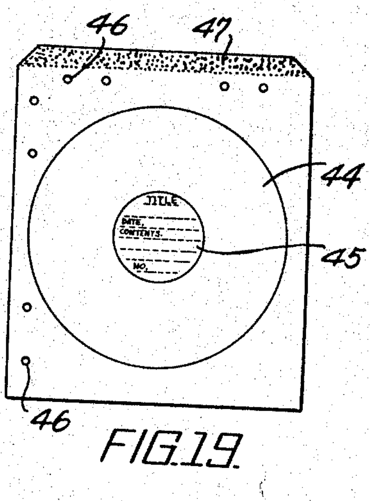
FIG. 19.
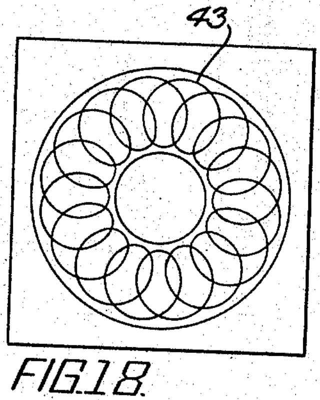
FIG. 18.

3,337,694

APPARATUS FOR SIGNAL TRANSDUCING ALONG A CURVED OVERLAPPING TRACK

Yoshiro Nakamatsu, 2–62 Shimouma-cho, Setagaya-ku, Tokyo, Japan

Original application Mar. 31, 1959, Ser. No. 803,241, now Patent No. 3,131,937, dated May 5, 1964. Divided and this application Feb. 21, 1964, Ser. No. 347,085
Claims priority, application Japan, Apr. 1, 1958, 33/8,664; Sept. 30, 1958, 33/27,784; Oct. 22, 1958, 33/30,258
16 Claims. (Cl. 179—100.2)

This application is a divisional application of my earlier filed application, Ser. No. 803,241, filed Mar. 31, 1959, now Patent No. 3,131,937.

The present invention relates to recording, reproducing and erasing apparatus and to associated methods. In particular, the apparatus is adapted to record a signal track in the form of a loop which extends along a predetermined path which may be straight or curved and open or closed. The path may be, for example, circular, rectangular or extend along a straight line. It is contemplated according to the invention to record a signal track of desired path on a record medium, and to reproduce such signal track, as well as erase the track if desired.

It is an object of the present invention to provide apparatus for achieving excellent signal recording and reproducing effects in an economical manner.

Another object of the present invention is to provide apparatus in which signal recording and reproducing can be effected for long periods using a signal record sheet or tape of relatively small area.

Other features and advantages of the present invention will become apparent with reference to accompanying drawings wherein:

FIG. 15 is a general diagrammatic plan view of apparatus for tracing a record track as shown in FIG. 1 or FIG. 18;

FIG. 16 is a side view of the apparatus of FIG. 15 viewed from the right side;

FIG. 17 is a sectional view of the apparatus of FIG. 15, with some parts of the apparatus omitted for purpose of clarification;

FIG. 18 is a diagrammatic plan view of a record sheet showing the record track traced by the apparatus of FIG. 15; and FIG. 19 is a similar view as FIG. 18 of a record sheet provided with descriptions in the central portion and filing holes on the edges.

Figures 1, 2, 3, 4, 5, 6, 7, 8, 9, 10, 11, 12, 13, 14:
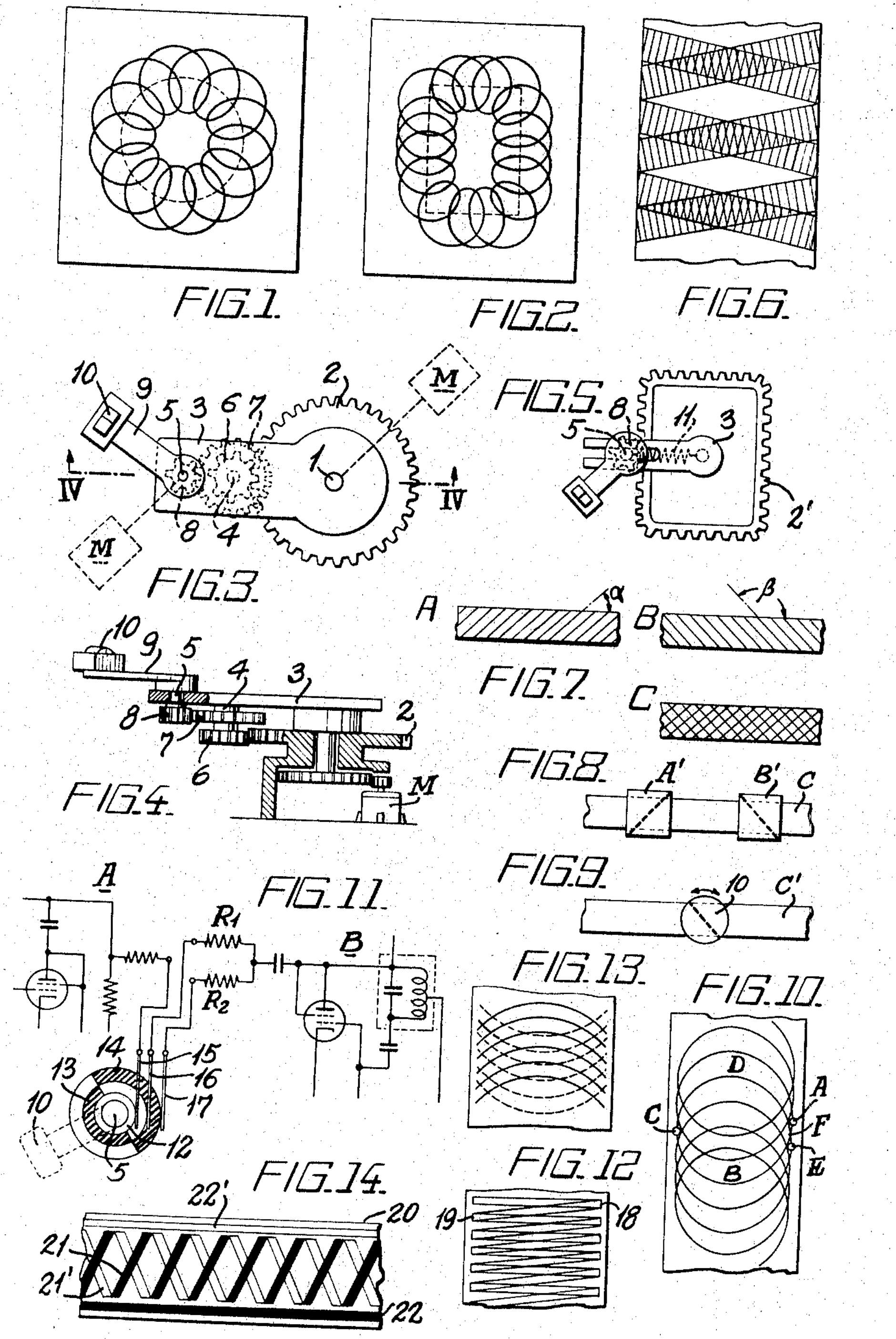
FIG. 1 is a plan view of a signal record sheet on which a signal record track of circular form is recorded according to the present invention.
FIG. 2 is a plan view similar to FIG. 1, but wherein the form of the signal track is rectangular.
FIG. 3 is a diagrammatic plan view of apparatus for forming the signal track of FIG. 1.
FIG. 4 is a diagrammatic sectional view of the apparatus of FIG. 3 taken along the line IV—IV of FIG. 3.
FIG. 5 is a diagrammatic plan view of apparatus for forming the track as illustrated in FIG. 2.
FIG. 6 is a view on an enlarged scale illustrating two intersecting tracks.
FIG. 7 illustrates a track formed with a head inclined in one direction, a track formed with a head inclined in an opposite direction and a track showing the above two tracks in overlapping relation.
FIG. 8 illustrates diagrammatically apparatus for forming the tracks of FIG. 7 using different heads.
FIG. 9 illustrates apparatus for forming tracks of FIG. 7 using one head which can be adjusted to provide different directions for the gap of said head.
FIG. 10 illustrates a sound track consisting of a number of loops extending along a straight line with a plurality of intersecting points.
FIG. 11 is a diagrammatic view illustrating an apparatus and an electric circuit for forming the track of FIG. 10 with a different bias depending on the portion of the track recorded so that interference between the intersecting tracks can be prevented.
FIG. 12 illustrates a zig-zag track on an enlarged scale showing the overlapping condition of tracks at the opposite ends.
FIG. 13 illustrates tracks formed by a plurality of heads on a turn table rotated in one direction and in the opposite direction and intersecting each other.
FIG. 14 illustrates a video-tape on which a sound track and a video track are formed in the advancement of the tape in one direction and another sound track and another video track formed in the advancement of the tape in the opposite direction and the two video tracks are in overlapping relation.

In order to produce a sound track as illustrated in FIG. 1, apparatus as illustrated in FIGS. 3 and 4 may be utilized.

In FIGS. 3 and 4, a plate 3 is mounted rotatably on an axle 1 of a fixed gear 2. On the plate 3 is fixed an axle 4 around which gears 6 and 7 are rotatably mounted. Another axle 5 is rotatably mounted in a fixed position on plate 3. The axle 5 has a fixed arm 9 at the end of which is secured a sound recording and reproducing head 10.

When the axle 5 is rotated by a motor M, the gear 7 is rotated through a gear 8 fixed on the axle 5. The gear 7 is integral with the gear 6 and rotatable around the axis 4, and hence the gear 6 is also rotated. The gear 6 is in meshing engagement with the fixed gear 2 and thus the gear 6 is rotated along the periphery of the fixed gear 2 to cause the rotation around the axle 1 of the plate 3 along with the gears 6, 7, 5 and the arm 9 and the head 10 while the head 10 is rotated about axle 5 to trace a continuous track consisting of a number of spiral loops proceeding along a circular line as illustrated in FIG. 1.

FIG. 5 illustrates an example of apparatus for tracing a sound track as illustrated in FIG. 2 which has a rectangular path. In this case, the fixed gear 2 of FIG. 3 is replaced by a rectangular gear 2'. In this embodiment, the intermediate gears 6 and 7 are omitted and the gear 8 is directly in mesh with the fixed gear 2'. The axle 5 of the gear 8 is slidably mounted in a slot provided in the plate 3 and is pulled by a spring II to secure the engagement between the gears 2' and 8. The similar simple construction may be used in the case of tracing the sound track of FIG. 1 in which case gear 2' will be replaced by a circular gear.

While in the examples above described, the axle 5 is rotated, the axle 1 may be rotated instead of axle 5. It is further to be understood that the general form of the sound track may be altered to any desired shape, simply by changing the shape of the fixed gear. For instance, if the fixed gear is replaced by a rack, the general form of the track is made a straight line which is very convenient when it is intended to form a sound track on a narrow tape.

While the explanation is made with respect to the case where the head is moved, the same result will be obtained by moving the sound track carrier (sheet or tape) instead of the head, or by moving both the head and the carrier, so long as relative motion between the head and the carrier provides the desired path on the carrier.

As illustrated in FIGS. 1 and 2, the sound track is in the form of loops in overlapping relation and has many intersecting points. These intersections do not cause much interference so long as the angle of intersection is greater than about 30°. However, it is desirable to prevent substantially all interference of the overlapping loops of the sound track.

According to the invention, the prevention of the interference of overlapping loops can be achieved by changing the angle of the inclination of the gap of the recording or reproducing head. It has been determined that suppression of interference can be obtained when the direction of the gap of the head in one track is made different by more than about 30° from the direction of the gap of the head in the overlapping track. FIG. 6 illustrates an example of overlapping tracks. When the angle is 90°, best results are obtained and when the angle is near 90°, substantially no interference is observed even if the two tracks are in completely overlapping relation. FIG. 7 illustrates a tape A with recorded signals thereon produced by a head inclined at an angle $\alpha$, a tape B with recorded signals thereon produced by a head inclined at an angle $\beta$ and a tape C including superimposed signals thereon. To produce the signals on tape C, the tape is recorded firstly with a head A′ or B′ (FIG. 8) and thereafter with the other head B′ or A′. The signals on the tape are reproduced with the head A′ or B′, and one track of the overlapping tracks will be reproduced selectively.

In the operation as described above, it is not necessarily required to have a plurality of heads and, if desired, the operation can be attained by single head, if it is so arranged that the inclination of the gap of the head may be varied. FIG. 9 is a diagrammatic view showing the principle of operation with single head. In the drawing, the head 10 is rotatable to adjust the angle of the inclination of the head in relation to the tape C′, and thus the overlapping tracks as on tape C in FIG. 7 can be easily produced with one head.

It has been found by the inventor that when the angle between the direction of the gap of a head and the direction of the gap of another head is greater than about 30°, the interference between the tracks recorded with these heads is so small that the reproduction of the track can be effected satisfactorily for practical use.

Accordingly, if desired, tracks up to six may be recorded in overlapping relation on one same record carrier by changing the direction of the gap. This will bring about great economy.

As described above, the interference between intersecting or overlapping tracks may be prevented by changing the inclination of the angle of the gap of a recording and reproducing head. However, still better results can be attained if different bias is applied to each of the intersecting or overlapping tracks. In the following, the application of different bias to each of intersecting or overlapping tracks will be explained.

FIG. 10 illustrates a sound track comprising many sound track loops proceeding in a straight line. Assume that the part ABC has a bias of a certain value, for example, bias voltage of 60 v. and the part CDE has a bias of a different value, for example of 30 v. At point F, the two loops intersect with each other, but they do not interfere with each other because of the difference of bias. According to this example, all the parts of the track running from right to left are provided with a certain value of bias which is different from the value of bias of all the parts of the track running from left to right. Thus the interference at all intersecting points will be avoided completely.

FIG. 11 illustrates a mechanism and electrical circuit for imposing bias of different values to different parts of the loops of the track. In the drawing, the head 10 has an arm 9 rotatable together with the axle 5 on which slip rings 12 for sound signals and slip rings 13 and 14 for controlling bias are integrally fixed. Sound signals are introduced from an amplifier A through a brush 15 and the slip ring 12 to the head 10 in case of sound recording. On this occasion, a bias is simultaneously introduced from a bias circuit B through a resistance $R_1$, a brush 16 and the slip ring 13 or through a resistance $R_2$, a brush 17 and the slip ring 14. The slip rings 13 and 14 are composed of an insulating material on half the circumference and an electric conductive material on the other half of the circumference, and the two rings are so arranged as the conductive part of either one of the two slip rings is connected with the bias circuit B. Accordingly bias of different value is introduced to the head 10 depending on the rotation of the axle 5.

In the above, the application of biases of different values to the intersecting loop sound tracks are described, but it is apparent that the same principle is applicable to superposing sound record tracks of any other form for the purpose of eliminating interference between these sound tracks.

FIG. 12 illustrates a sound track in zig-zag form in which sound tracks are in overlapping relation on opposite side ends 18 and 19.

FIG. 13 illustrates another sound track consisting of a number of sound tracks convex upwardly and a number of sound tracks convex downwardly and these two forms of sound tracks intersect in many points. If the bias value of the tracks extending from left to right in FIG. 12 or of the upwardly convexed tracks in FIG. 13 is made different from the bias value of the tracks extending from right to left in FIG. 12 and of the downwardly convex tracks in FIG. 13 respectively, the interference between the intersecting tracks can be suppressed satisfactorily. The principle of the application of bias of different values are described above is not limited to sound record tracks but also applicable to the other systems of recording signals.

FIG. 14 illustrates the application of different biases to a video-tape 20. The video-tape has a video signal track 21 inclined to the right and a sound signal track 22, both of which are formed when the tape 20 is passed in one direction, and also a video signal track 21′ inclined to the left and a sound signal track 22′, both of which are formed when the tape is passed in the reverse direction. A bias of different value is applied depending on the direction of passing the tape and thus the interference of intersecting video signal track can be avoided.

One of the embodiments of the apparatus according to the present invention will be explained with reference to FIGS. 15–17.

The apparatus has a casing 23 in which a gear 2 and an axle 1 are fixed. On the fixed axle 1 is rotatably mounted a turn table 3. On the turn table 3 are mounted a motor M and a battery B. The motor is adapted to rotate a rubber wheel or a gear 24 and a rubber wheel or a gear 25.

The gear 25 has at its center a fixed axle 26 on which one or two heads 10 are fixed by means of an elastic leaf arm 27. It is apparent that when the motor M is operated, the two heads 10 rotate together with the gear 25 and the axle 26. The gear 25 is in engagement with a gear 28 which is in turn in engagement with the fixed gear 2 through a suitable gear system. Accordingly, the turn table 3 is rotated around the fixed gear 2 when the motor is operated. Thus the heads 10 will be rotated around the fixed axle 1 while being rotated around the axle 26 to trace a track as illustrated in FIG. 1.

The operation of the motor M is controlled by a switch 29 which is operated by a push button 30 urged normally upward by a spring 31 to cut off the circuit. When the sound recording or reproducing has been completed, the rotation of the turn table is stopped together with the rotation of the head by means of the push button 30 mentioned above which comes in contact with the switch 29 to cut off the motor circuit again.

In the casing 23, various instruments such as a microphone or a speaker 31 and an amplifier 32 are accommodated, and a panel plate 33 having a wide circular window is fixed on the casing and on this panel plate a magnetic sound record sheet or a pile of the magnetic record sheets is placed with the magnetic film facing downwardly.

On the top of the casing 23, a transparent pressing plate or frame 34 is mounted by means of hinged arms 35 so that the pressing plate or frame 34 can be moved up and down maintaining a position parallel to the surface of the panel plate 33. The heads 10 are pressed against the surface of the magnetic sound record sheet mounted on the panel plate 33 by means of an elastic arm 27 and thereby recording and reproducing can be effected.

In the apparatus as described above, the position of the heads cannot be seen from the top. In order to see the position of the heads easily, indication pins 36 are provided on the circumference of the turn table 3 and an indication disc 37 is provided as shown in FIG. 15. When the turn table is rotated, one of the indication pins 36 comes into engagement with the indication disc 37 to rotate the disc and the degree of the rotation of the disc can be seen from the top by a proper scale provided on the surface of the panel plate 33.

As shown in FIG. 15, the panel plate 33 has projected edges 38 on three sides and a sound record sheet is placed between these edges and the sheet can take a proper position on the panel plate by the guidance of these edges. On the upper side edge of FIG. 15, leaf springs 39 are shown. These springs serve to press the sheet mounted on the panel plate against the opposite side to facilitate the setting of the sheet in position. On the side where no projection is provided, a notch or hole 40 is provided to allow the insertion of a finger or fingers from this side. The provision of such a hole facilitates the withdrawal of a sheet, particularly when a pile of sheets is placed between the pressing plate 34 and the panel plate 33.

In the operation of the apparatus, the central portion of the record sheet is not to be recorded. In order to maintain the sheet in a horizontal position despite a wide opening in the panel plate 33, it is preferable to provide an auxiliary supporting plate 41 in the position corresponding to the central portion of the turn table 3. This auxiliary supporting plate 41 may be fixed on the casing 23 or may be rotatably mounted on the fixed axle 1.

In the above example, it is preferable to use two heads simultaneously, but it is to be understood that recording and reproducing can be effected satisfactorily with one head. When two heads are used, the heads may be connected either in series or in parallel but it is preferable to connect them in series. When two springs are used and are connected in parallel, the apparatus can be used conveniently for obtaining stereophonic sound.

In the example above explained, the application of bias as explained with reference to FIGS. 10 and 11 has not been employed. But it is apparent that such application can be conducted readily by using slip rings and brushes as explained with reference to FIG. 11. In FIG. 15, 42 indicates a slip ring brush which may be used for the supply or delivery of a signal.

When a magnetic sound record sheet is produced by the described apparatus, the sound record track 43 as shown in FIG. 18 is obtained. The sides, particularly the corners, and the central portion of the sheet are not used for recording the track. Accordingly, magnetic coating material such as $Fe_2O_3$ or $Fe_3O_4$ is applied by printing or otherwise only in an annular portion 44 of the sheet as shown in FIG. 19 for the sake of economy. The central blank portion 45 may be used for descriptive material or any other indication as desired, while the edge blank portions may be used for providing filing holes or marks or any descriptions as desired. Further a place 47 for adhesive may be provided along the edge.

The above description, is directed to magnetic sound recording and reproducing apparatus and methods, but the principle of the present invention is also applicable to optical systems.

As will be seen from the above, according to the invention, a record track carrier can be used with many signal tracks in overlapping or superposing relation, and these tracks can be effectively separated in the use of said carrier with an apparatus which is simple, compact and inexpensive.

The track is continuous and has no abrupt interruptions or changes of direction and consequently smooth and excellent recording and reproducing can be conducted.

When the apparatus as illustrated in FIG. 15 is used, a long recording or reproducing period is obtained with one rotation of the turn table and consequently the rotation speed of the turn table is very slow. This results in a saving of the energy required for the operation. When recording and reproducing is completed, the turntable is returned to the starting point and does not require any adjustment of position and is in position for subsequent recording or reproducing. This saves much effort in operation.

In the method and the apparatus of the present invention, it is not necessary to use a number of recording and reproducing heads which are expensive, but a single head or two heads are sufficient for the operation; thus reducing the cost of the apparatus.

Further, with the apparatus of the present invention, recording and reproducing is conducted with one head or two heads which are in contact with the sheet all the time, and it is not necessary to move the head to bring the same into contact or out of contact with the record carrier. This makes the construction of the apparatus and the operation thereof simple and smooth.

What is claimed is:

1. Apparatus for recording and reproducing a signal track on a record medium, said apparatus comprising a rotatable main supporting member, an arm member mounted rotatably on the main supporting member, a signal transducer head fixed on said arm member, and means for interlocking the rotation of the supporting member and the rotation of the arm member to rotate the arm member a plurality of times during each rotation of the main supporting member, the record medium having an extent greater than the maximum excursion of the signal transducer whereby a continuous signal track of a closed endless form consisting of a number of intersecting loops can be transduced on said medium.

2. Apparatus according to claim 1, which comprises bias means for applying different magnetic recording biases on the intersecting loops, said bias means comprising two slip rings including insulating parts and conductive parts in alternate relation, brushes operatively associated with the slip rings, resistances of different values associated with respective brushes to form two circuits of different resistances and to apply magnetic recording biases of different value according to the position of the head which is connected to the slip rings.

3. Apparatus according to claim 1, comprising indicator means operatively associated with and indicating the position of said head.

4. Apparatus according to claim 1, comprising an automatic stop switch operated at a predetermined position of said main supporting member.

5. Apparatus according to claim 1, wherein said arm moves only perpendicularly to said head.

6. Apparatus according to claim 1, comprising a plurality of heads to provide a stereophonic system.

7. Apparatus according to claim 1, comprising pressing and panel plates holding a plurality of record sheets therebetween whereby the apparatus can record and play continuously by the withdrawal of the record sheets as the recording or reproducing thereon is completed.

8. Apparatus according to claim 7, which comprises an auxiliary central supporting plate fixed in relation to a record sheet placed on said panel plate to support the latter said sheet.

9. Apparatus according to claim 7, comprising projecting setting stoppers to set record sheets on said panel plate.

10. Apparatus for recording and reproducing a signal track on a record medium, said apparatus comprising a displaceable main supporting member, an arm member mounted rotatably on the main supporting member, a signal transducer head fixed on said arm member, and means for interlocking the displacement of the supporting member and the rotation of the arm member to rotate the arm a plurality of times upon displacement of the main supporting member, the record medium having an extent greater than the maximum excursion of the signal transducer whereby a continuous signal track of a number of intersecting loops can be transduced on said medium.

11. Apparatus according to claim 10, which comprises bias means for applying different magnetic recording biases on the intersecting loops, said bias means comprising two slip rings including insulating parts and conductive parts in alternate relation, brushes operatively associated with the slip rings, resistances of different values associated with respective brushes to form two circuits of different resistance and to apply magnetic recording biases of different value according to the position of the head which is connected to the slip rings.

12. Apparatus as claimed in claim 10 wherein said means interlocking the displacement of the supporting member and the rotation of the arm member causes said signal transducer head to trace loops which intersect one another at an angle of at least 30°.

13. Apparatus as claimed in claim 10 comprising means supporting the main supporting member for displacement along a curved path.

14. Apparatus as claimed in claim 13 wherein said means which support the support member defines a closed circular path of displacement therefor.

15. Apparatus as claimed in claim 10 comprising means supporting the main supporting member for displacement along a path which is partially composed of a straight length.

16. Apparatus as claimed in claim 15 wherein said means which supports the support member defines a closed rectangular path of displacement therefor.

References Cited

UNITED STATES PATENTS

| | | | |
|---|---|---|---|
| 2,251,919 | 8/1941 | De Boer et al. | 274—46 |
| 2,347,623 | 4/1944 | Wagner | 274—46 |
| 2,975,238 | 3/1961 | Jones | 179—100.2 |
| 3,012,104 | 12/1961 | Kleis | 179—100.2 |

BERNARD KONICK, *Primary Examiner.*

NORTON ANSHER, *Examiner.*

J. F. PETERS, *Assistant Examiner.*